United States Patent [19]

Bergius

[11] 4,125,166
[45] Nov. 14, 1978

[54] CONTROL SYSTEM AND METHOD FOR LOADING OF ENGINE DRIVEN APPARATUS

[76] Inventor: Rauno Bergius, Koivikkotie 17, 40250 Jyvaskyla 25, Finland

[21] Appl. No.: 771,929

[22] Filed: Feb. 25, 1977

Related U.S. Application Data

[63] Continuation-in-part of Ser. No. 570,479, Apr. 22, 1975, abandoned, Continuation-in-part of Ser. No. 415,531, Nov. 13, 1973, abandoned.

[30] Foreign Application Priority Data

Nov. 15, 1972 [FI] Finland ............................. 3215/72

[51] Int. Cl.² .......................................... A01B 63/112
[52] U.S. Cl. ........................................ 172/1; 60/431; 172/3; 172/7; 172/430
[58] Field of Search ...................... 172/1, 2, 3, 4, 7, 8, 172/9, 10, 11, 12, 430; 37/DIG. 1; 73/119 A; 123/139 T, 139 ST, 139 E, 139 AA, 140 MC; 180/53 R, 53 C, 53 D; 280/446 R, 446 A, 490 R, 490 A; 60/423, 431; 404/84; 214/762, 764

[56] References Cited

U.S. PATENT DOCUMENTS

| | | | |
|---|---|---|---|
| 2,986,291 | 5/1961 | Schick | 214/762 X |
| 3,078,656 | 2/1963 | Jedrzykowski | 60/431 |
| 3,358,774 | 12/1967 | Lipinski | 172/1 |
| 3,490,538 | 1/1970 | Lipinski | 172/1 |
| 3,698,249 | 10/1972 | Weaver | 73/119 A X |
| 3,751,903 | 8/1973 | Bauchet et al. | 60/423 X |
| 3,803,574 | 4/1974 | Logue | 37/DIG. 1 X |
| 3,871,344 | 3/1975 | Pigeroulet et al. | 123/139 ST |

Primary Examiner—Richard T. Stouffer
Attorney, Agent, or Firm—Steinberg & Blake

[57] ABSTRACT

A control system and method for loading an engine driven apparatus such as an engine driven tractor having a plough the depth of which can be regulated by a suitable control system. The engine has a fuel injection pump which includes a maximum fuel feed limiting structure, a stop, and a structure for urging the maximum fuel feed limiting structure against the stop when an overload is imposed on the engine. Under the latter overload conditions the force with which the maximum fuel feed limiting structure is urged against the stop is detected by way of a force transducer such as a strain gauge or hydraulic pressure transducer, so that a signal indicative of the overload is produced and can be utilized for reducing the load on the engine. Thus, in the case of an engine-driven tractor which operates a plough, the latter signal can be utilized to raise the plough so as to reduce the load on the engine.

7 Claims, 4 Drawing Figures

FIG. 2

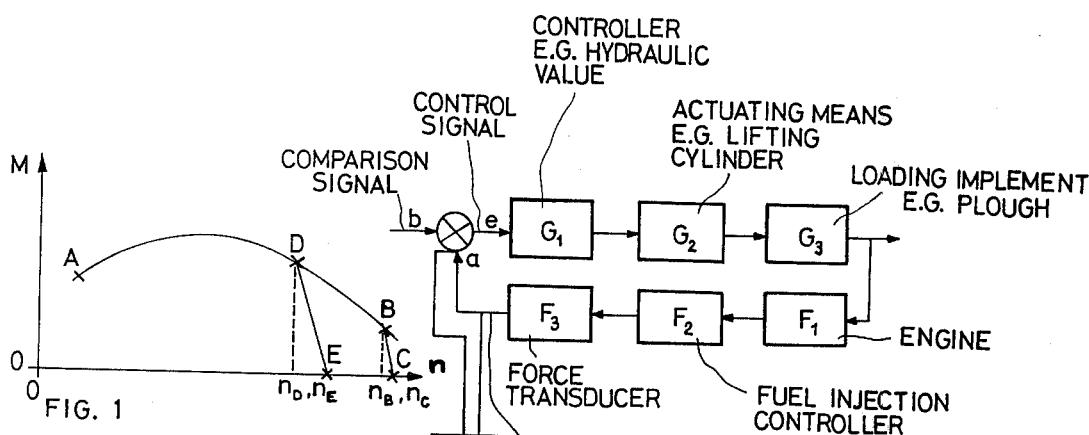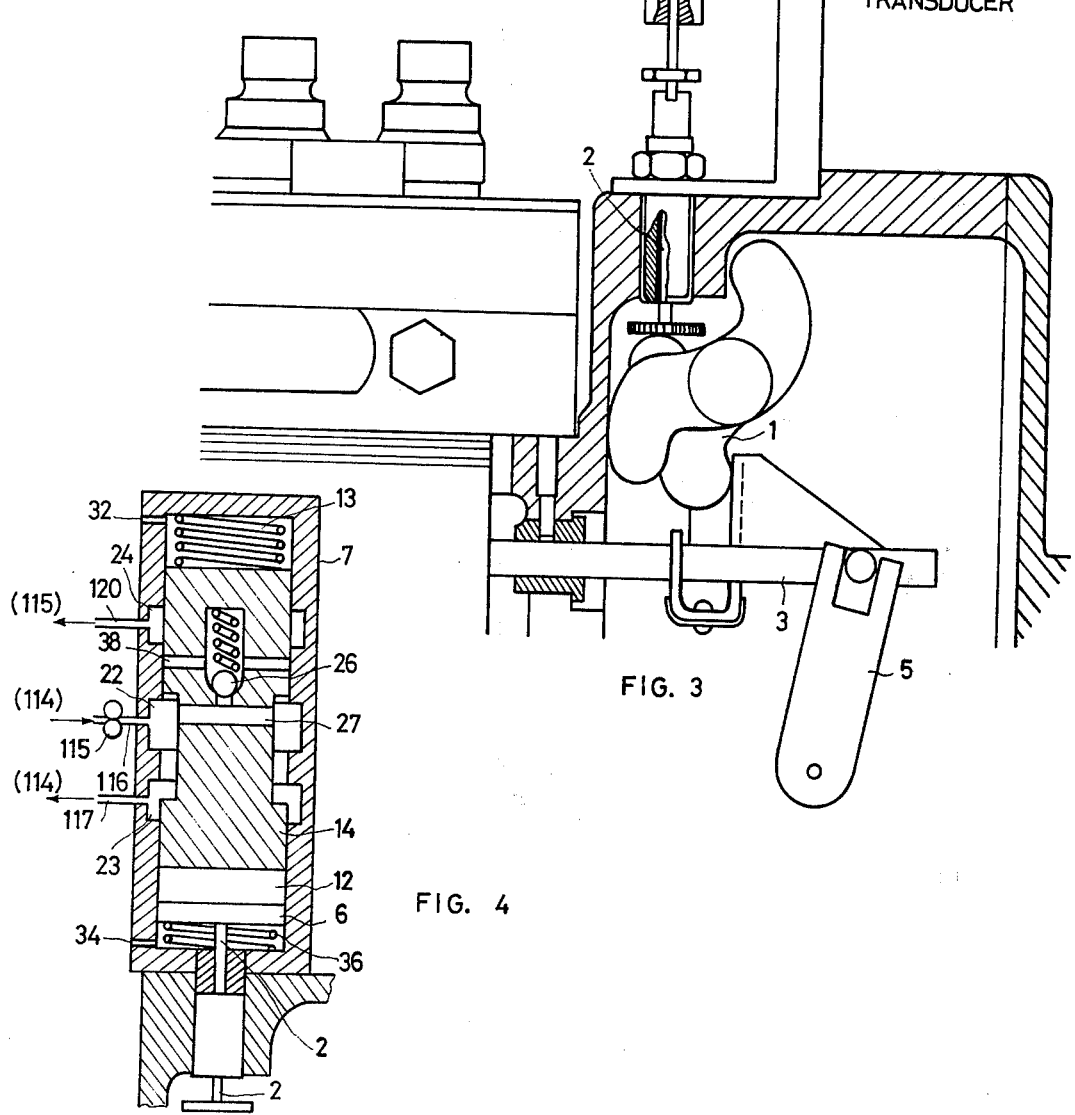

CONTROL SYSTEM AND METHOD FOR LOADING OF ENGINE DRIVEN APPARATUS

CROSS REFERENCE TO RELATED APPLICATION

This application is a continuation-in-part of copending application Ser. No. 570,479, filed Apr. 22, 1975, now abandoned, the latter application being a continuation-in-part of application Ser. No. 415,531, filed Nov. 13, 1973, now abandoned.

BACKGROUND OF THE INVENTION

The present invention relates to a system and method for regulating the load on an engine-driven apparatus.

For example, an engine-driven tractor having a lifting mechanism is capable of carrying out various operations such as ploughing, harrowing, trailer towing, towing a combine drill, and other equivalent operations Other operations performed by an engine driven apparatus such as a tractor are pulling or pushing a prime mover and carrying out tasks in municipal service soil engineering and peat milling.

In performing work of the above general type there is as a general rule a certain dominating factor. For example such a dominating factor is the ploughing depth when performing ploughing operations, a given supporting force or a given pressure in the power cylinder of the lifting mechanism when a combine drill is towed, the brushing depth or brushing pressure against the surface in street repair work, the milling depth in peat milling, etc. It is highly advantageous when carrying out practical operations of the above type to maintain this dominating factor substantially constant. For a number of different reasons, however, when operations of the above type are carried out certain variables which reflect the operating condition of the tractor or disturbance thereof, such as slip and overloading of the engine, should be eliminated, so that it is necessary to make certain concessions in stabilizing such a dominating factor, and in addition it is necessary to govern such operations as the hydrostatic power transmission and/or the differential drive lock automatically in order to have the work proceed smoothly.

In tractors and other types of apparatus driven by engines such as diesel engines, such engines include a fuel injection pump which forms part of the engine-speed control mechanism. For example, the operator of a tractor has control over a speed-control lever by means of which the operator may set the desired speed. If as a result of an increase in the external load such as in increase in the resistance encountered by a plough, there is a load on the engine which exceeds the maximum torque consistent with the desired engine speed, then the fuel injection of the engine can no longer increase and instead the engine speed falls off. At this point the driver should shift to a lower gear or take other steps in order to reduce the external load so as to prevent stopping of the work.

It is already known to provide measures intended to alleviate problems of the above type. However, the known expedients suffer from serious drawbacks such as simply limiting the maximum fuel which can be delivered to the engine without controlling the load or if the load is automatically regulated the arrangements provided for this purpose are exceedingly complex and expensive.

SUMMARY OF THE INVENTION

It is accordingly a primary object of the present invention to provide a method and system which will avoid the above drawbacks.

In particular, it is an object of the present invention to provide a method and system which will assure creation of a signal when overload conditions occur, so that such a signal may be utilized to reduce the load on the engine.

In addition it is also an object of the present invention to provide a method and system according to which in response to a signal of the above type automatic operations are carried out for reducing the load on the engine.

Thus, one of the objects of the invention is to provide a control system which may be an electronic control system for a tractor, capable of rendering the work of the tractor as flexible and rapid as possible.

Also it is an object of the invention to provide a control method and system for rendering automatic operations which normally would be carried out by the tractor operator.

In addition it is an object of the present invention to provide for a method and system of the above type a construction which utilizes to a very great extent structure already present in conventional engines.

According to the method and system of the present invention, when an overload is imposed on an engine which has a fuel injection pump, a maximum fuel-feed limiting means is urged against a stop, and the force with which the stop is engaged by the maximum fuel-feed limiting means is detected so that by utilizing this force it is possible to carry out operations, either manually or automatically, for reducing the load on the engine.

BRIEF DESCRIPTION OF DRAWINGS

The invention is illustrated by way of example in the accompanying drawings which form part of this application and in which:

FIG. 1 is a typical maximum torque curve of a diesel engine;

FIG. 2 is a block diagram illustrating a control system and method of the present invention;

FIG. 3 is a schematic partly sectional side view showing a control mechanism of the fuel injection pump of an engine, together with a transducer means; and FIG. 4 shows part of the structure of FIG. 3 connected with a hydraulic pressure transducer.

DESCRIPTION OF PREFERRED EMBODIMENTS

Referring to FIG. 3, there is illustrated schematically therein a fuel injection pump of an engine, this fuel injection pump having the illustrated control structure which is common in diesel engines, the structure of FIG. 3 being conventional with the exception of the transducer structure and the means for creating a signal at the transducer structure when an overload is imposed on the engine, as described below.

Referring to FIG. 1, there is illustrated therein a typical maximum torque curve ADB of such an engine. At the point B, the maximum torque has the highest rated speed of rotation $n_B$, for which the engine has been set. On transition from the operating point B along straight operating line BC toward the higher speeds, the governor of the diesel engine's fuel injection pump (most commonly a centrifugal governor) continuously reduces the fuel injection so that at arrival at point C (speed $n_C$) the torque of the engine equals zero. The driver has control over an engine speed control lever, pedal or equivalent by means of which he may set the engine speed $n$ so that it equals or is smaller than $n_C$ (at moment M = O), for instance $n_E$. With this engine speed setting the engine operates on the straight line DB, with the speed $n_D$ at the point of maximum torque. The diesel engine's fuel injection pump governor automatically takes care of such fuel injection control that the engine operates at various points on the line of operating DB, depending on the moment M required.

According to FIG. 3, the control means of the diesel engine's fuel injection pumps comprise a maximum fuel injection limiting means 1 and its stop 2, which together restrict the movement of the control rod 3 in the direction of increasing fuel injection. When the engine speed control lever has been set to correspond with the line of operation DB and the moment M caused by the external load and loading the engine remains smaller than the maximum torque consistent with point of operation D, the maximum fuel feed limiting means 1 remains separated from stop 2 by effect of a control mechanism (not depicted) known in itself. When with the said setting the engine speed falls off from the value $n_D$ owing to overloading of the engine, the fuel injection maximum fuel feed limiting means 1 presses against its stop 2 with a force which is greater accordingly as the engine speed falls off more strongly from $n_D$ and a greater overload is encountered. According to the invention, the force acting between the maximum limiting means 1 and its stop 2 is used for producing a signal $a$ which constitutes a measure of the diesel engine's overload. To this purpose, the stop has been connected as FIG. 3 reveals, to an arm transveral to it and which carries a strain gauge 4, which produces a signal proportional to the force pushing against the stop 2. It is obvious that the signal proportional to said force may also be produced by a means other than a strain gauge: for instance, by an electrical, pneumatic or or hydraulic force or pressure transducer, which are in themselves known.

FIG. 3 shows a lever 5, the position of which is determined by hand levers or pedals in the driver's cabin by the aid of linkages. A linkage independent of the said control levers or pedals transmits the movement of the centrifugal governor to move the lever 5 to the right if the set value of r.p.m. (which has been set by the levers/pedals mentioned) exceeds the rated r.p.m., and to the left if it is lower than the rated r.p.m. In the overload situation, the centrifugal governor urges by mediation of lever 5 the maximum limiting means 1 against the stop 2, whereby the force thus produced forms the overload measuring signal with the aid of the strain gauge 4 in the measuring bridge.

FIG. 2 shows the block diagram of a control system according to the invention, wherein the block $F_1$ in the feedback path represents the diesel engine, $F_2$ the fuel injection controller of same, and block $F_3$ represents a force transducer as shown in FIG. 3 with associated signal producing and handling means, from which a signal $a$ constituting a measure of the engine's overload is obtained. In the block diagram, the signal $b$ represents the set-point value of the control system, to which the signal $a$ of the feedback path is compared, thus obtaining the signal $e$ governing the control system. However, the signal $a$ may also be employed directly as the governing signal $e$. In the block diagram, $G_1$ represents the controllers proper, for instance hydraulic valves. The controller $G_1$ controls the actuating means $G_2$, such as lifting cylinders. The actuating means $G_2$ act upon the externally loading implement $G_3$, which is for instance a plough pulled by the tractor and which imposes a load on the diesel engine $F_1$ as shown in the block diagram. In the exemplary case it is thus understood that the hydraulic valve serving as controller $G_1$ governs the lifting cylinder actuating means $G_2$ in such manner that the working depth of the plough operating as loading implement $G_3$ is reduced accordingly as the overloading of the engine $F_1$ increases.

It is also possible by means of the signal $a$ to inform the tractor operator of the presence of an overload of the engine, for example, by way of a warning light or a buzzer which forms a display means, as indicated schematically in FIG. 2.

Thus, as is apparent from the above description, the force transducer 4 forms a force-detecting means for detecting the force with which the maximum fuel feed limiting means 1 is urged by the means 3 against the stop 2 when an overload is imposed on the engine, and in this way the detecting means 4 can provide a signal $a$ which is proportional to the force and which can be utilized in an electronic manner, for example, in order to control the regulating means formed by the units $G_1$ and $G_2$ in order to operate this regulating means to reduce the load on the engine as by raising the plough indicated by the block $G_3$ in FIG. 2. In addition it is of course possible by way of the warning light or buzzer, which forms a display means, to indicate to the operator that an overload condition is imposed on the engine, and then the operator can manually raise the plough so as to reduce the overload on the engine.

In addition, as indicated in FIG. 3, the force transducer or detecting means 4 can take the form of a hydraulic pressure transducer. A construction of this type is illustrated in FIG. 4.

Thus, referring to FIG. 4 it will be seen that the stop 2 which is acted upon by the maximum fuel feed limiting means 1 in the same way as in FIG. 3 is in the case of FIG. 4 operatively connected with a piston 6 which is movable within a cylinder 7 of a hydraulic pressure transducer or force-detecting means. This means of FIG. 4 is similar to a corresponding hydraulic pressure transducer shown in FIG. 5 of U.S. Pat. No. 3,358,774 to Lipinski, the detecting means of FIG. 4 operating in the same way as the corresponding structure of the latter U.S. patent to bring about control of the load on the engine as will be apparent from the description which follows.

In FIG. 4 the cylinder 7 of the detecting means is fixed to the illustrated structure in any suitable way so that the force exerted on the stop 2 by the maximum fuel feed limiting means 1 will be transmitted to the piston 6. Just above the piston 6 in FIG. 4 is a working chamber 12 containing a suitable liquid such as oil which engages not only the upper face of the piston 6 but also the lower face of a freely movable piston 14 acted upon at its upper end by a spring 13. The chamber within which the spring 13 is located communicates with the outer atmosphere through an opening 32 in the cylinder 7, whereas the space in the cylinder 7 beneath the piston 6 communicates with the outer atmosphere through an opening 34. This space beneath the piston 6 in FIG. 4 accommodates a spring 36 which with respect to the spring 13 has a relationship according to which the parts will assume the position shown in FIG. 4 under equilibrium conditions when there is no overload on the engine.

The interior of the cylinder 7 is formed with an annular groove 22 communicating through a pipe 116 with a tank 114 from which liquid under pressure is pumped into the groove 22 by way of a pump 115. When the parts are in the position shown in FIG. 4, this liquid delivered by the pump 115 to the groove 22 can travel to the groove 23 so as to flow therefrom through the return pipe 117 back to the tank 114.

As was shown in FIG. 4, above the groove 22 the cylinder 7 is formed with a further annular groove 24 which communicates through a pipe 120 with a lifting cylinder 118 shown, for example, in FIG. 2 of the above U.S. Pat. No. 3,358,774, so that when liquid under pressure flows through the pipe 120 to the lifting cylinder 118 a plough will be raised by way of the mechanism shown in U.S. Pat. No. 3,358,774. However, in the normal equilibrium position of the parts shown in FIG. 4 the piston 14 prevents the groove 22 from communicating with the groove 24, so that in this particular position ploughing operations, for example, can go forward while the liquid pumped by the pump 115 is returned to the tank 114.

Assuming now that an overload condition is encountered, then of course the maximum fuel feed limiting means 1 will press on the stop 2 so as to urge the latter upwardly, as viewed in FIG. 4, and the result is that through the liquid in the working chamber 12 the piston 14 will be displaced upwardly. This liquid can be supplied to the chamber 12 through any unillustrated opening passing through the wall of the cylinder 7 and closed by a plug after the required hydraulic pressure liquid is situated in the working chamber 12.

Thus, under the above overload conditions the piston 14 will be displaced upwardly in opposition to the force of the spring 13 as a result of the increased pressure with which the piston 6 is urged upwardly by the stop 2 in response to pressing of the maximum fuel feed limiting means 1 against the stop 2. The result is that the piston 14 will move upwardly until it cuts off communication between the grooves 22 and 23 and instead places the grooves 22 and 24 in communication with each other through the check valve 26. Now the liquid pumped by the pump 115 will travel from the groove 22 through the check valve 26 and the bore 38 in piston 14 communicating therewith to the groove 24 so that the liquid under pressure will now reach the lifting cylinder 118 so as to raise the plough. In this way the load on the engine will be automatically reduced, and the spring 13 will expand to return the parts to the position shown in FIG. 4.

Thus it will be seen that with the detecting means of FIG. 4 the force with which the maximum fuel feed limiting means 1 presses against the stop 2 is detected by the piston 14 which may be considered as producing a signal corresponding to the signal $a$, the cooperation between the piston 14 and the groove 24, corresponding to the controller or hydraulic valve unit $G_1$ of FIG. 2, with this controller acting through the pipe 120 so as to transmit the liquid under pressure to the actuating means or lifting cylinder 118 which serves to control the loading implement such as a plough, as indicated by the unit $G_3$ of FIG. 2. Of course, upon raising of the plough, the load is reduced so that the engine $F_1$ of FIG. 2 responds to again operate under the equilibrium conditions as shown in FIG. 4.

It is to be noted that in the above U.S. Pat. No. 3,358,774 to Lipinski, it is the space beneath the piston 14, as viewed in FIG. 4 of the present application, which is occupied by the spring 13 whereas the opposite end of the piston 14 receives the fuel, the pressure of which drops under overload conditions, so that in the latter patent the spring expands to bring about the same operations as described above in connection with FIG. 4.

What is claimed is:

1. In a method of operating an apparatus driven by an engine having a fuel injection pump which includes a maximum fuel feed limiting means, a stop, and means urging said maximum fuel feed limiting means against said stop when an overload is imposed on the engine, and a means for regulating an external load on the engine, the steps of detecting the force with which said maximum fuel feed limiting means is urged against said stop when an overload is imposed on the engine, so that the detected force can be utilized for regulating the load imposed on the engine, converting the detected force into a signal proportional to said force, transmitting said signal to said regulating means, and operating said regulating means in response to said signal for reducing the external load when an overload is imposed on the engine.

2. In a method as recited in claim 1 and wherein the apparatus includes an agricultural tractor having a plough, with said regulating means including a controller and an actuating means for controlling the depth of said plough, the steps of utilizing said signal to act through said controller on said actuating means for controlling the depth of said plough.

3. In a method as recited in claim 2 and wherein the controller is a hydraulic valve while the actuating means is a lifting cylinder, and including the steps of utilizing said signal to act through the hydraulic valve on the lifting cylinder for raising said plough when an overload is imposed on the engine.

4. In an apparatus driven by an engine having a fuel injection pump, maximum fuel feed limiting means in said fuel injection pump, a stop, means urging said maximum fuel feed limiting means against said stop when an overload is imposed on the engine, detecting means connected with said stop for detecting the force with which said maximum fuel feed limiting means is urged against said stop, so that the detected force can be utilized for regulating the load imposed on the engine, and a control system comprising a means for regulating an external load on the engine, means connected with said detecting means for producing a signal proportional to the detected force, and means transmitting said signal to said regulating means for controlling said regulating means to reduce the external load when an overload is imposed on the engine.

5. The combination of claim 4 and wherein a display means is connected with said detecting means for indicating when an overload is imposed on the engine.

6. The combination of claim 5 and wherein said display means includes a warning light.

7. The combination of claim 5 and wherein said display means includes a warning buzzer.

* * * * *